United States Patent [19]

Scott et al.

[11] Patent Number: 5,054,569

[45] Date of Patent: Oct. 8, 1991

[54] REMOTE VEHICLE STARTING SYSTEM

[75] Inventors: Steven S. Scott, Caribou, Me.; Robert W. Franklin, Farmington, Conn.; Manfred Davis, New York, N.Y.

[73] Assignee: Comfort Key Corporation, New Britain, Conn.

[21] Appl. No.: 236,295

[22] Filed: Aug. 23, 1988

Related U.S. Application Data

[63] Continuation-in-part of Ser. No. 78,079, Jul. 27, 1987, abandoned.

[51] Int. Cl.5 .......... B60T 7/16

[52] U.S. Cl. .......... 180/167; 123/179 BG; 340/502; 341/176

[58] Field of Search .......... 180/167, 169; 123/179 B, 179 BG; 340/502, 539; 341/176

[56] References Cited

U.S. PATENT DOCUMENTS

| | | | |
|---|---|---|---|
| Re. 30,686 | 7/1981 | Bucher | 123/179 B |
| 2,569,332 | 9/1951 | Perkins | 123/179 A |
| 2,887,588 | 5/1959 | Williams | 123/179 B |
| 3,054,904 | 9/1962 | Fuciarelli | 123/179 J |
| 3,455,403 | 7/1969 | Hawthorne | 180/167 |
| 3,665,475 | 5/1972 | Gram | 455/92 |
| 3,727,070 | 4/1973 | Liang | 290/38 |
| 3,811,049 | 5/1974 | Hildreth et al. | 290/38 |
| 3,859,540 | 1/1975 | Weiner | 123/179 BG |
| 4,163,968 | 8/1979 | Davis | 340/539 |
| 4,227,588 | 10/1980 | Biancardi | 180/167 |
| 4,361,133 | 12/1982 | Malik | 123/179 BG |
| 4,446,460 | 5/1984 | Tholl et al. | 340/825.69 |
| 4,674,454 | 6/1987 | Phairr | 180/167 |
| 4,928,778 | 5/1990 | Tin | 180/287 |

OTHER PUBLICATIONS

Wizard Vehicle Security System, Moss Systems, Inc., Long Beach, CA.
Automatic Engine Starting Control, ASCO Control.
Transtart Owner's Manual Transtart, Inc.

*Primary Examiner*—Charles A. Marmor
*Assistant Examiner*—Eric Culbreth
*Attorney, Agent, or Firm*—McCormick, Paulding & Huber

[57] ABSTRACT

A novel system for use in remotely starting a motor vehicle and operating vehicle accessories includes a remote unit having a digital controller which provides encoded digital command signals and a vehicle unit which receives the digital command signals and controllably operates the vehicle's engine and accessories in dependence thereon. The system is characterized by a frequency shift keying method of signal transmission which is highly reliable and not burdened by known carrier on, carrier off techniques.

37 Claims, 6 Drawing Sheets

REMOTE VEHICLE STARTING SYSTEM

This is a continuation-in-part of co-pending application Ser. No. 078,079 filed on July 22, 1987, now abandoned.

BACKGROUND OF THE INVENTION

The present invention relates to the field of remote engine starters and more particularly to a remote starter for automotive vehicles having an onboard computer to control ignition and fuel/air mixture. Examples of such vehicles include those which use a "Multi-Port" fuel system to replace a conventional carburetor.

The prior art in this field has used oil pressure indication to turn off the starter once the engine has started. Mechanical timers have also been used to sequence the engine start. Computers also have been used to turn off the engine after a pre-set time has elapsed.

SUMMARY OF THE INVENTION

An object of the present invention is to provide a system for remote operation of vehicle components.

Another object of the present invention is to provide a computerized system which will easily interface with an onboard vehicle computer used to control engine and accessory operation.

According to the present invention a system for use in selectively operating components of a vehicle includes components which are controlled by a vehicle computer. The system includes a unit remote from the vehicle that has an input device for providing signals indicative of the remote unit identification and a desired operational state of the vehicle components. A controller generates command signals from the input signals and further generates, from decoded status signals, signals indicative of the operational state of the vehicle components. Also included is a transmitter which encodes the received command signals and provides radio frequency transmission thereof. A receiver decodes received status signals. A display mechanism is included which displays the state of the engine and accessories. The system also includes a unit affixed to the vehicle that has a receiver for decoding received command signals and a mechanism configured with the vehicle components which provides signals indicative of the operational state of those components and also signals indicative of the vehicle unit identification. A controller provides component status signals from the operational state and identification signals, and generates for the components control signals which are dependent on the received command signals. A transmitter encodes the status signals and provides for radio frequency transmission thereof. A mechanism is included for operating the vehicle components in dependence on the control signals.

The present invention provides a remote control vehicle starter system that is simple and inexpensive in construction. The present invention also provides a remote control vehicle starter system employing solid state circuitry and takes advantage of the onboard computer of modern vehicles. Integrated circuits are provided for both the engine starting sequence as well as for the remote control unit that receives signals from the vehicle indicative of the condition of the vehicle's engine. Provisions are included in the present system to stop the engine should an unauthorized person attempt to enter the vehicle.

DESCRIPTION OF THE PREFERRED EMBODIMENT

Figure 1:
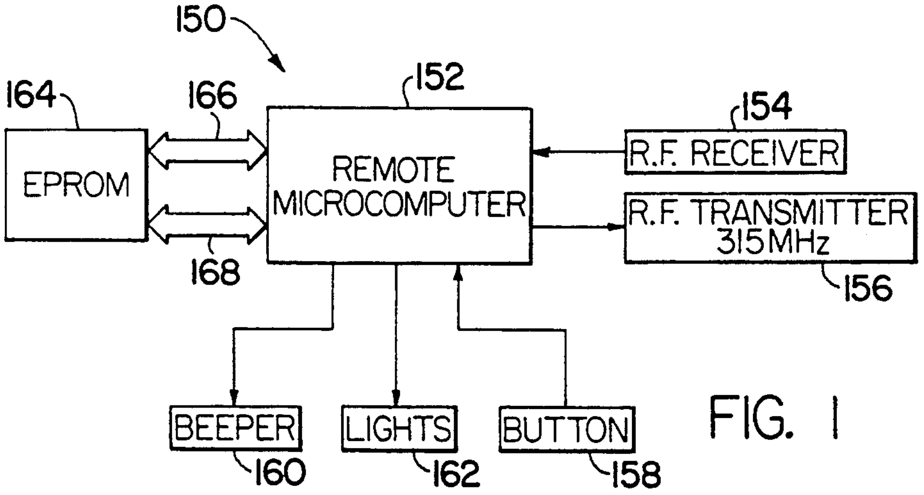
FIG. 1 is a simplified schematic illustration of a remote unit, part of a remote vehicle operating system provided according to the present invention.
Figure 2:
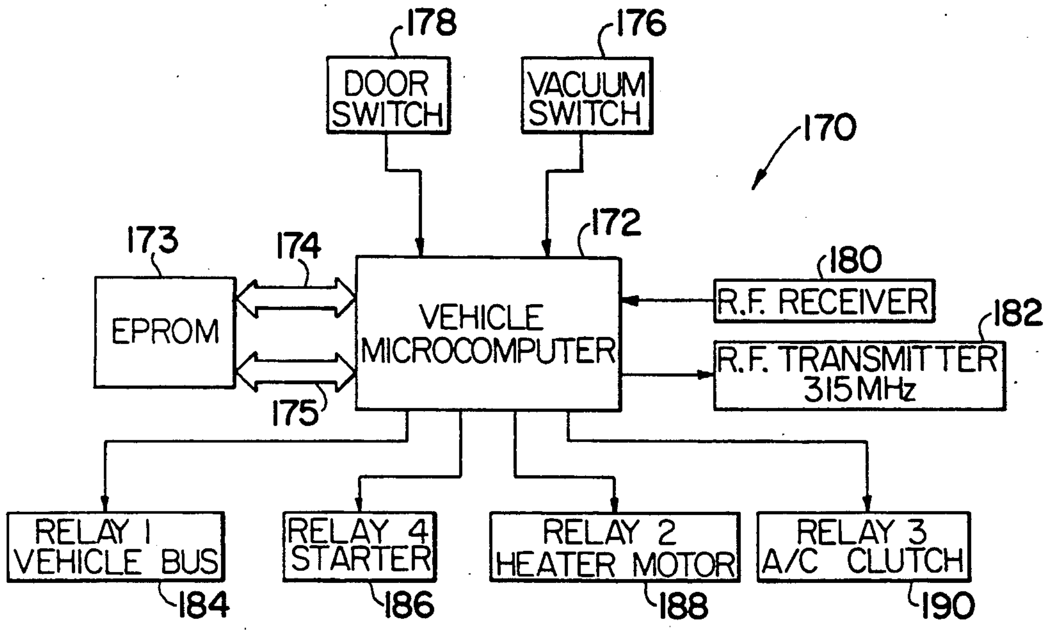
FIG. 2 is a simplified schematic illustration of a vehicle unit, part of a remote starting system provided according to the present invention.

In the preferred embodiment, the present remote starting system comprises a remote unit and a vehicle unit. Each is schematically illustrated in FIGS. 1 and 2, respectively. Referring to FIG. 1, a remote unit 150 comprises a microcomputer 152 programmed as detailed hereinafter. The remote unit also includes a conventional radio frequency (RF) receiver 154 and transmitter 156 for providing control signals to the vehicle unit and for receiving verification signals therefrom. The remote unit is preferably configured to be operated manually, receiving input signals by means of a button 158 and providing information regarding the operation of the vehicle via beeper 160 and lights 162.

The microcomputer 152 is conventional, and in the preferred embodiment comprises a National Semiconductor control oriented processor (COP), such as a National Semiconductor Model No. 424 or 425 processor. Also included is sufficient conventional memory means as well as an erasable programmable read only memory (EPROM) 164 which communicates with the microcomputer via data bus 166 and address bus 168. In the EPROM resides the software needed to perform the remote unit function described herein.

Referring now to FIG. 2, there is shown a vehicle unit 170 provided according to the present invention. The vehicle unit comprises a microcomputer 172 similar to the microcomputer detailed hereinabove with respect to the remote unit. EPROM 173 is also included and communicates with the microcomputer 172 on address bus 174 and data bus 175. Switches 176 and 178 are provided in the vehicle for sensing engine vacuum and door position, respectively.

The vehicle unit also comprises a radio frequency (RF) receiver and transmitter 180 and 182, respectively, for communicating with the remote unit. Also included are several relays which are provided to control the several functions performed by the vehicle unit. Relay 184 is provided to energize the vehicle computer. Relay 186 is configured to the starter, while relays 188 and 190 control the heater motor and air conditioning (A/C) clutch, respectively.

Figure 3:
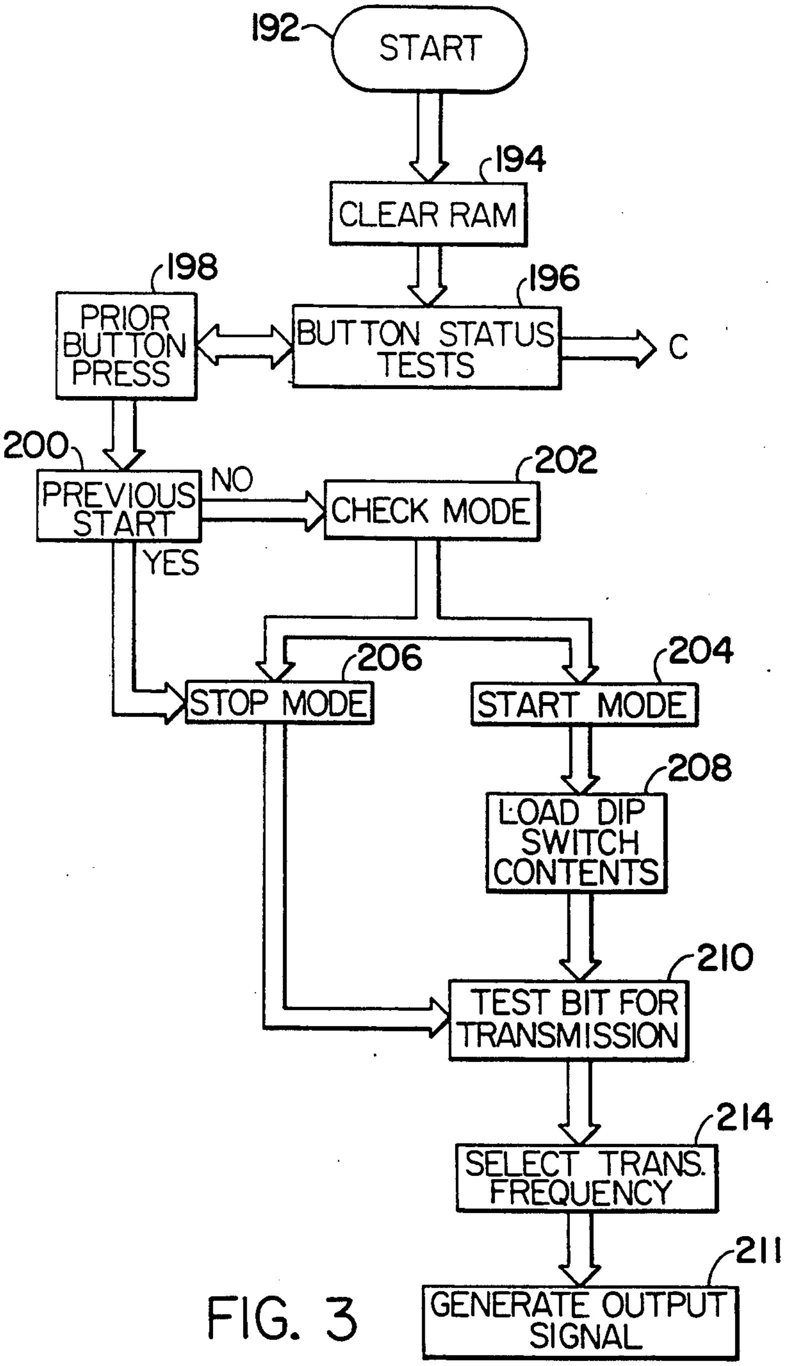
FIG. 3 is a simplified schematic illustration of a first algorithm used with the remote unit of FIG. 1.

Referring now to FIG. 3, there is diagrammatically illustrated a preferred operational sequence of the remote unit. At the start of the sequence (block 192) the unit is manually energized which causes the random access memory (RAM) associated with the microcomputer to be cleared (block 194). When the operator presses the command button, the microcomputer performs a button status test (block 196) to determine whether the button has been previously pushed in the current command sequence (block 198).

At block 202 control bit information is loaded in dependence on the above button test to determine whether the control signal should correspond to a command start (block 204) or stop (block 206) the vehicle's engine. If the car has not been previously started as determined at Block 200, the unit will enter the start mode programming and continue to load for transmission (block 208) the contents of a series of preset dip switches in the microcomputer that contain system identification information. The switches are conventional, and are set either open or closed to generate a corresponding digital signal.

Figure 4:
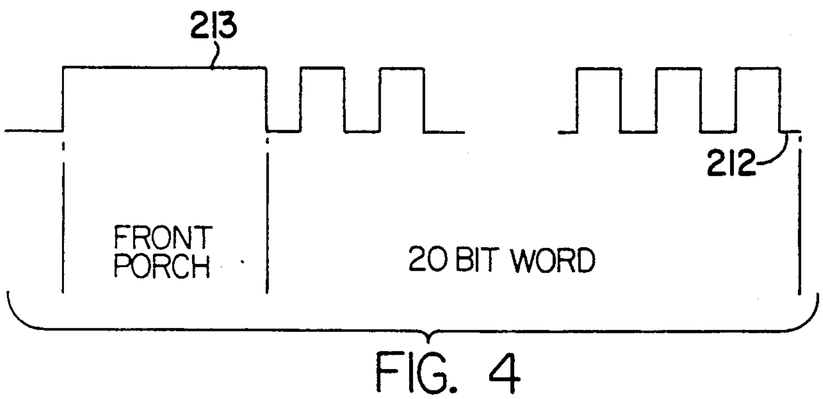
FIG. 4 is a diagrammatic illustration showing the preferred method of signal transmission between the remote and vehicle units.

Each signal bit loaded for transmission is tested to determine whether it has a logic 1 or 0 value (block 210) before a signal is generated by the transmitter (block 211). As detailed in FIG. 4, signals are transmitted between the remote and vehicle units in accordance with a digital encoding method known as FSK or frequency shift keying. The carrier frequency is preferably generated in accordance with a known "superregenative" signal generation method although other known techniques may be substituted.

Superregenative signal generation techniques are known and are used in a variety of products, such as the Transcience Model PT1D T150 and T160 transmitter. The frequency shift keying encoding method is distinct from conventional carrier on, carrier off transmission techniques in that a carrier, preferably a carrier at a frequency between 265 and 315 mHz, is modulated by a subcarrier tone. In the preferred embodiment, 20 bits of information (curve 212) are transmitted proceeded by a 14 bit wide "front porch" signal portion (curve 213) which signifies an incoming data signal. Each bit is followed by an equally wide period of nonencoded transmission (carrier frequency only). Each bit is modulated at either 14 or 23.7 kilohertz frequency that corresponds to a logic 1 or 0, respectively (block 214, FIG. 3). Consequently, the frequency selected for transmission depends on the bit content.

The front porch signal portion functions as indicated above and the 20 bits of information contain control information, i.e. whether the command is a start or stop, and the identification information specific to the vehicle system. This ensures that there is an almost zero chance of miscommunication between the remote unit and another vehicle unit within receiving distance. As is known, frequency shifted keying transmission techniques provide superior performance over conventional carrier on, carrier off transmission encoding schemes. Not only does the present transmission technique avoid the unwanted power bursts which burden conventional carrier on, carrier off transmission techniques but the present method and apparatus also possesses the inherent noise filtering capabilities outline above, and detailed in U.S. Pat. Nos. 3,665,475 and 4,163,968 which are incorporated herein by reference.

In the preferred embodiment, the 20 bit word is transmitted 8 times which allows the receiver 180 to check the contents of the word for authenticity' thereby further ensuring that no spurious signals will activate or deactivate the vehicle's engine. However, the remote unit is programmed to consider a successful transmission to comprise at least two words.

Figure 5:
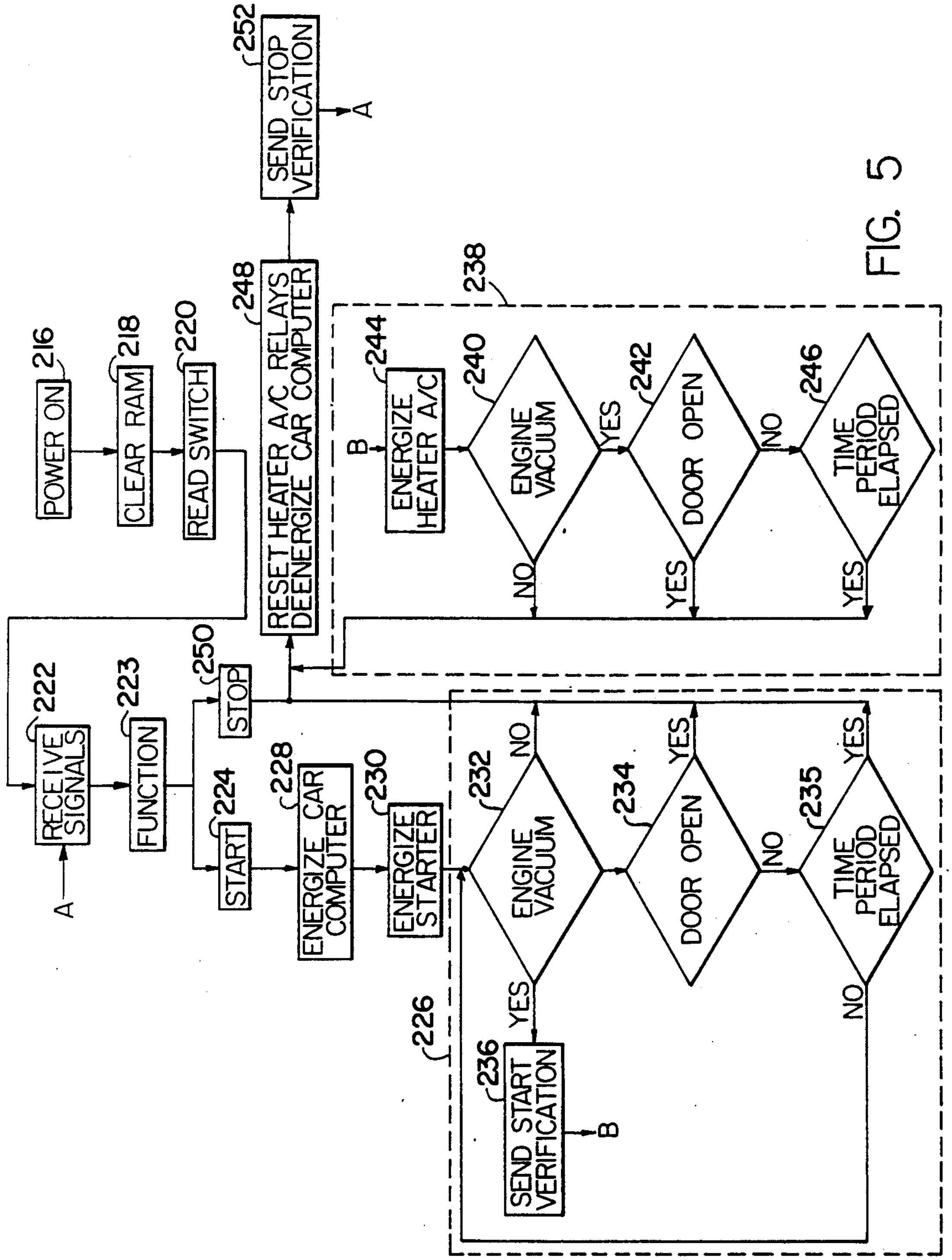
FIG. 5 is a simplified schematic illustration of an algorithm used by the vehicle unit of FIG. 2.

In FIG. 5 there is diagrammatically illustrated a preferred operational sequence of the vehicle unit. When the vehicle unit is installed, the unit is powered on. (block 216) The random access memory, (RAM) (block 218) is cleared and the contents of the microcomputer dip switches are then read into the computer memory (block 220). The unit then enters into an untimed receive sequence (block 222) in which the radio frequency (RF) receiver portion of the unit is configured to receive incoming signals from the remote unit. In the preferred embodiment, the vehicle unit is configured to receive signals for only approximately 10 percent of the time. For example, in a 100 millisecond period the receiver is disabled for 90 milliseconds and enabled for only 10 milliseconds.

Once the receiver detects a "front porch" signal portion, the receiver provides the subsequent 20 bit word through to a conventional shift register in the microcomputer. As each word is clocked into the shift register the microcomputer performs a check of the signal's integrity in which the contents of the first and the twenty-first bits are constantly compared. The contents of these bits should be identical if the received signal is validly transmitted from the remote unit. If at least two words are successfully clocked through the register, transmission is deemed successful.

Once the microcomputer determines that a valid signal has been received, the signal is interrogated at block 223 to determine what function has been commanded from the remote unit. If the microcomputer detects a valid signal to start the car (block 224), the microcomputer enters into a first timed loop 226 after the microcomputer energizes a computer resident in the car (block 228) and cranks the starter (block 230) for one second. At one tenth second intervals, the computer interrogates both the vacuum switch (block 232) and door switch (block 234) to see if the engine is operating and generating a vacuum and if a door is open. The total time for this loop is seven and a half ($7\frac{1}{2}$) seconds (block 235).

If an engine start is indicated by a positive engine vacuum the engine will exit the first time loop immediately and generate a start verification signal to be transmitted back to the remote unit (block 236). Note while in this section of the algorithm, the vehicle microcomputer will not respond to incoming signals until either the loop terminates or the vacuum switch signal indicates a vacuum has been generated and the engine has started.

After a successful engine start has been indicated, the microcomputer is programmed to enter into a second timed loop 238 having a total duration of approximately 18 minutes. During this second loop, the vacuum and door switch are monitored periodically (blocks 240, 242) as is the receiver for incoming command signals. Depending upon the content of the encoded signals, the engine continues to run and the heater blower or the air conditioner is energized (block 244) by means of the addressable relays described hereinabove. If a stop command signal is received (block 250) or upon the expiration of the time period (block 246) the microcomputer will remove power from the engine, disable the car computer and disengage a heater relay or an air conditioning clutch relay, if energized, during the 18 minute period (block 248) and generate a stop verification signal (block 252).

Figure 6:
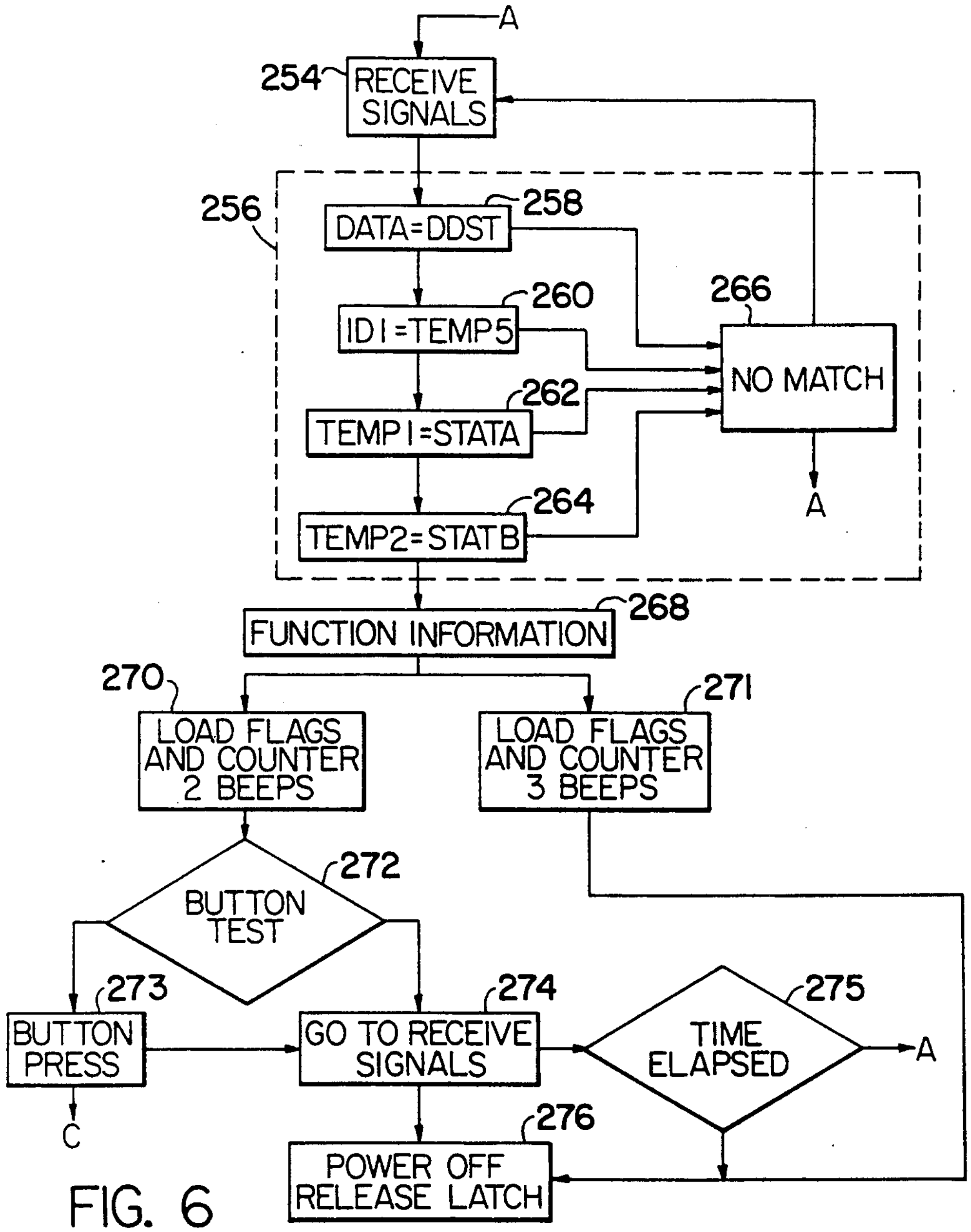
FIG. 6 is a simplified schematic illustration of a second algorithm used by the remote unit of FIG. 1.

As noted, the vehicle unit generates start and stop verification signals. These signals are received and decoded by the remote unit in a manner illustrated in FIG. 6. The received signal (block 254) is analyzed (block 256) in 4 bit increments for verification. The labels in blocks 258 through 264 correspond to the 4 bit wide addresses used in the preferred microcomputer and the contents of the remote dip switches against which the received signals are compared. At each 4 bit increment, the signals are checked for verification and if there is no match with the incoming signals (block 266) the microprocessor will again return to the receive mode at block 254. Note that if, in response to a start signal sent by the remote unit, no subsequent verification signal is received within 15 seconds of transmission (block 275), the remote unit microcomputer will power off.

Once the remote unit microcomputer has a valid signal, the function portion of the signal is decoded (block 268) to determine whether the vehicle engine has started or stopped. If it has started, the microcomputer will generate a signal, preferably a sequence of 2 audible beeps (block 270). Similarly, if the engine has stopped, a sequence of 3 audible beeps will be generated (block 271) and the unit will power off (block 276).

If a valid start signal has been received, the microcomputer tests to see whether the button has been released (block 272). If the button has not been released the computer continues in the algorithm. Therefore, a continual uninterrupted button press will not result in multiple commands being automatically sent to the vehicle unit. Without a button release test it would be possible to start and immediately stop the vehicle's engine, or alternatively, to stop and immediately start the engine. The preferred algorithm avoids these undesirable situations.

If the button has been released the microcomputer determines at block 273 whether the button has been subsequently pressed. If not, the program continues, but if there has been a subsequent button pressed the computer returns to the algorithm of FIG. 3 at block 196.

Once the remote unit has received a valid start signal, the microcomputer will, at block 274, go to the receive mode (block 254). The microcomputer receive mode indicated at block 254 is similar to that described hereinabove with respect to the vehicle unit in that it is enabled to receive signals for approximately 10 milliseconds out of every 100 millisecond period. The total period in which the remote unit is in this receive mode is preferably 25 minutes or some time longer than the timed period in which the engine in the vehicle is programmed to operate. At the end of the remote unit time period (25 minutes) if there is still no received stop signal the remote unit will, at block 276, automatically depower and cease operation until manually reenergized.

Figure 7:
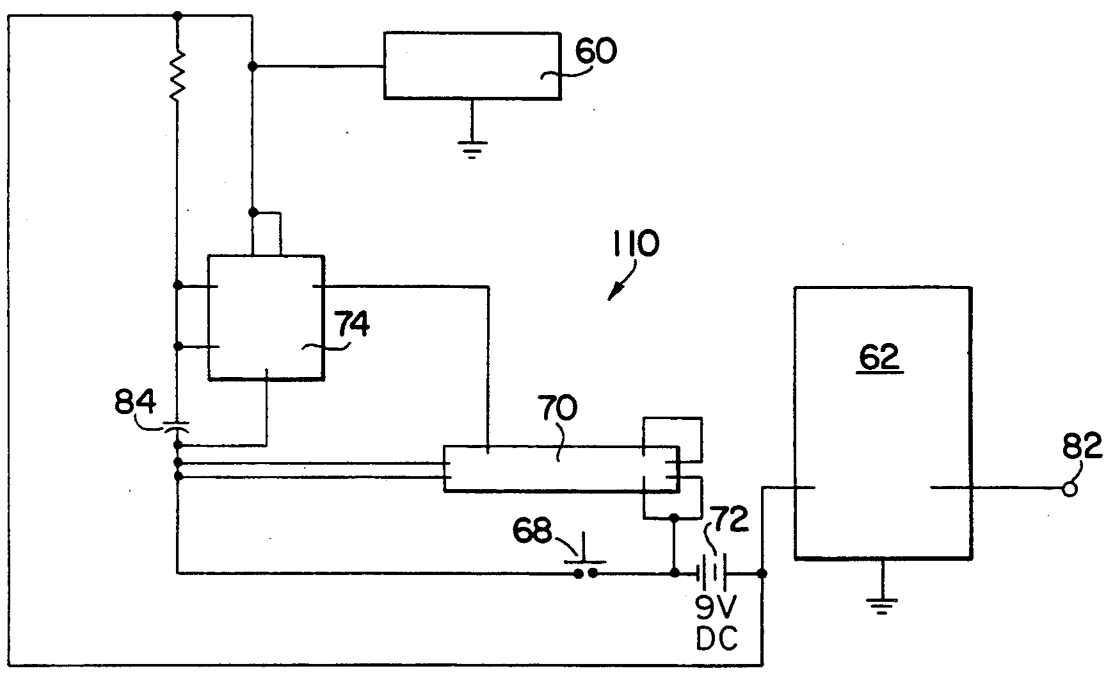
FIG. 7 is a circuit diagram of an alternative hand held remote control unit.
Figure 8:
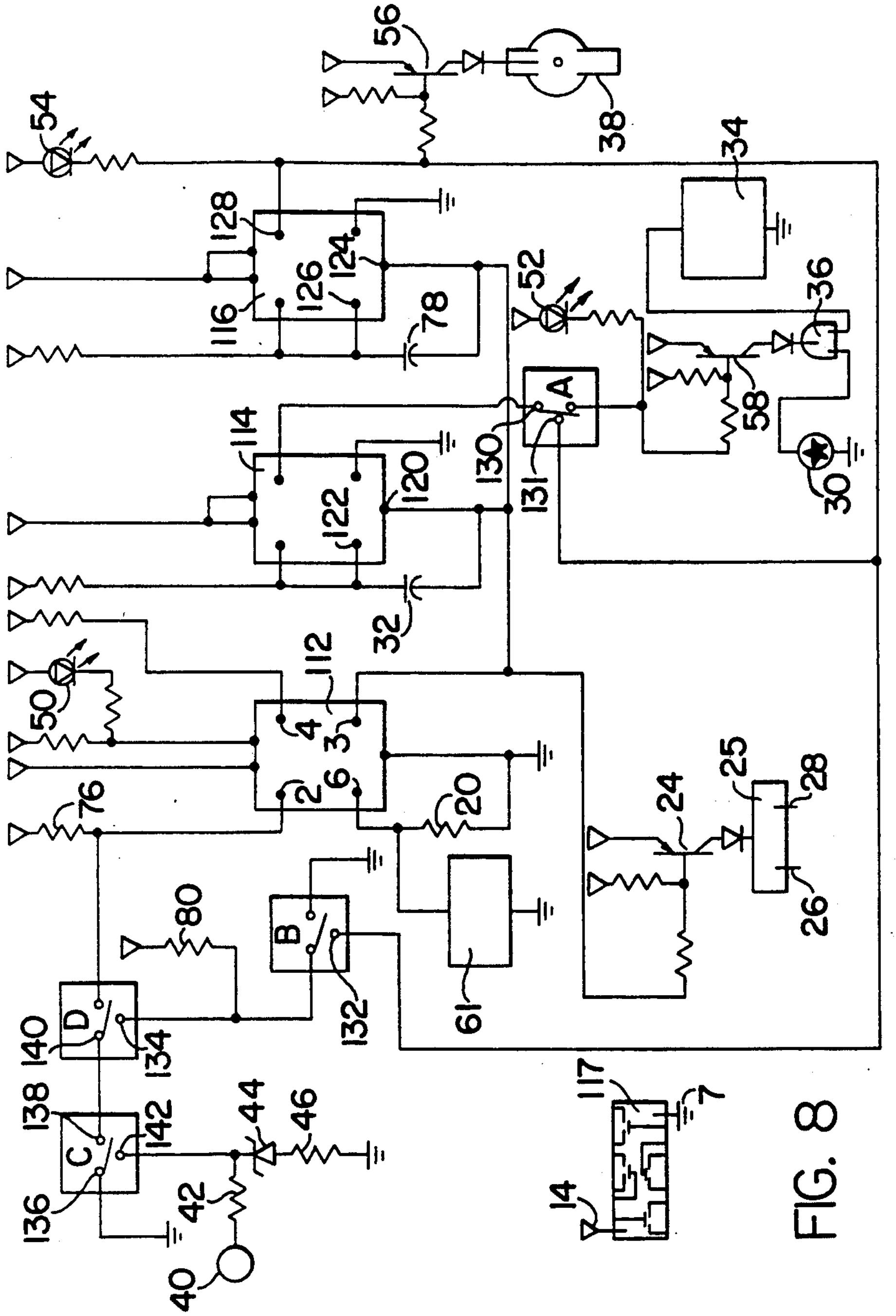
FIG. 8 is a circuit diagram of an alternative main logic board which is located in the vehicle.

FIGS. 7 and 8 are simplified diagrammatic illustrations of an alternative vehicle starting system. A main logic board 118 is mounted hidden in the vehicle in question (not shown). A portable hand held radio control unit 110 which has a range of several hundred feet from the vehicle in question is also included. On the main logic board 118, there are four integrated circuit sections 112, 114, 116 and 117. These integrated circuit sections will be detailed hereinafter in reference of the operation of the alternative embodiment. Three (3) Darlington transistors 24, 56 and 58 are also included. The function of these components likewise will be detailed hereinafter. A Zener diode 44 is also mounted on the main logic board 118. A master switch 68 is provided to place the circuits in operation. Four (4) other electrical switches 278, 280, 282 and 284 are also provided. The functions of these electrical switches will also be detailed hereinafter. One (1) nine volt battery 72 is used in the hand held unit 110. A delay or timer circuit 74 is provided in the form of a fifth integrated circuit section. A first relay 70 is provided to work in conjunction with the master switch 68 and the delay circuit 74. A vacuum switch 36 is provided in series with the start solenoid 30. The vacuum switch 36 has 2 contacts; one normally open and one normally closed. A primary radio transmitter 60 is provided in the hand held unit 110. A radio transceiver 62 is provided which functions as a radio receiver. The second transmitter 34 is provided with main logic board 118.

Light emitting diodes (LEDs) 50, 52 and 54 are provided to indicate operating conditions of the invention and will be further described in reference to the operation of the invention. Certain elements are shown which in fact are located on the vehicle. For example, heater motor 38, starter solenoid 30 and the door light switch 40 all are located on the vehicle in question (not shown). In addition to the active circuit elements, various resistors and capacitors are provided to aid the function of the circuits. For example, the Zener diode 44 is connected to ground through a 10k ohm resistor 46. Likewise, the Zener diode 44 is connected to a reset door light switch 40 by means of a 10k ohm resistor 42. A 4.7k ohm resistor 20 is provided between pin 6 of integrated circuit section 112 and ground. A 10 microfarad capacitor 32 is provided as a timing element to function with integrated circuit switch 114 which will be detailed in reference to the operation of the invention. Capacitor 78 is provided for a similar function with regard to integrated circuit section 116. A 20 microfarad capacitor 84 is associated with integrated circuit section 74 as a time delay. The Darlington transistors 24, 56 and 58 are also provided with input and base resistors. A junction 25 is provided, connecting to the output of Darlington transistor 24 so that the transistor output can be applied to vehicle auxiliary circuits by a lead 26 and to the vehicle ignition circuit by a lead 28. Resistors 76 and 80 are provided to receive the plus 12 volt d.c. supply which will be referred to hereinafter as vcc. The primary radio transmitter 60 is provides radio frequency (RF) digitally encoded output signals. It will be understood that the integrated circuit sections may be a know NE555 type I.C. timer. The relay 70 which may be a Matsushita Co. relay type AE5613. The fourth integrated circuit section 117 has as many as 14 terminals. This integrated circuit may be a number 4066 Analog FET Gate manufactured by the Fairchild National Semiconductor Co. It will be understood that although only two numbered leads 14 and 7 are shown coming out of integrated circuit 117, that the other numbered leads are located elsewhere on the circuit diagram on switches 278, 280, 282 and 284 with corresponding numbers although not shown physically connected to integrated circuit 117. A 12 volt d.c. (vcc) supply is shown as a plurality of triangles, on FIG. 8. For example, resistor 76 is supplied from the 12 v d.c. bus and an LED is supplied from the 12 v d.c. bus.

In order to understand the operation of the invention, it is necessary to understand the main function of each of the integrated circuit sections. Integrated circuit section 112 is for the onboard computer on the vehicle (not shown) and the auxiliary vehicle circuits. I.C. section 112 is set up as set-reset flip-flop mode. Integrated circuit section 114 is used for actually driving the starter solenoid 30. The integrated circuit 116 is used, in part, for turning on the vehicle heater motor 38 or an air conditioner. The integrated circuit 117 is used for the inversion of several voltage levels that were not adequately unaltered for circuit operation. I.C. 74 also functions as a delay circuit.

The hidden main logic board 118 on the vehicle is initially triggered. This is done by pressing switch 68 on the hand held unit 110 of FIG. 7. This action sends a radio signal from radio transmitter 60, to a receiver board 61 (on the vehicle). This lets the first section 112 of the integrated circuit begin operation.

The first section 112 of this integrated circuit, provides power to the onboard computer (not shown) on the vehicle and to the electrical bus system 26 and 28. When the output of section 112 is at the proper level on pin 3, power is sent to junction 25 and the following two I.C. sections 114 and 116. Transistor 24 produces the current that is necessary to operate circuits 26 and 28. This is because I.C. section 112 cannot withstand the current drain of the other circuits. The next I.C. section is 114. This section 114 takes approximately 5 to 10 seconds to build up to its operating voltage level after I.C. section 112 is activated. This I.C. section 114 drives or turns on, the starter solenoid 30. This is what actually starts the vehicle engine.

A vacuum switch 36 is placed in the circuit so that once the vehicle has started running the vacuum switch 36 disconnects the starter (not shown) and provides power to the retransmitter 34. This transmitter 34 sends a radio signal back to the hand held unit 110 of FIG. 7. Inside the hand held unit is the radio transceiver 62 with a small beeper (not shown) on it. When the transceiver 62 is activated, the beeper lets the user know the vehicle has started. When the transceiver 62 stops beeping, the user knows that the next section 117 of the I.C. has been activated.

Section 116 performs several functions. First, it will turn on the heater or the air conditioner, as selected by the operator. Secondly, it makes the electrical switch 286 disconnect the power to the transistor 58 the starter 30 and retransmitter 34. This assures that the starter 30 will not be activated due to any problems in the circuit of the vehicle. Thirdly, I.C. section 116 makes the electrical switch 288 disconnect, allowing resistor 80 to close switch 290. With switch 290 closed, any attempt to open the vehicle doors will terminate the operation of the engine and reset the starting circuit. If the door is opened, the door light switch places a voltage on resistor 42 which closes switch 292. With the switch C closed, the proper voltage level is present on pin 2 of I.C. section 112 and this resets the main logic board.

All three I.C. sections 112, 114 and 116 have light emitting diodes (LEDs) connected to their outputs e.g., (pin 3 on I.C. section 112,) as remote indicators of vehicle conditioners. The LED's colors are: LED 50 red, LED 52 amber and LED 54 green. The LEDs indicate that their associated circuit is in operation. The red LED 50 indicates to the user that the main logic board 118 has received the radio signal from the hand held unit 110 that the vehicle computer is energized and that the vehicle is ready to start. The amber LED 52 indicates that the starter (not shown) of the vehicle is turning. The green LED 54, when on, shows that the vehicle heater motor or air conditioner is energized. It also indicates that the starter (not shown) is assured to be out of the circuit.

Also in the hand held unit 110 of FIG. 1 is a timer circuit 74 and relay 70 which work in conjunction with each other so that when the main switch 68 is closed and after the radio transmitter 60 sends the signal, the receiver board 62 still has power and is ready to receive the transmitted signal from the radio transmitter 34 on the vehicle. One 9 volt battery 72 is all that is needed.

If it is desired to again start the vehicle the master switch 68 in the hand held unit 110 is closed. This energizes relay 70. However, integrated circuit 74 functions as a delay circuit to transmit a signal, then waits for four to five seconds. Integrated circuit section 112, which is configured as set-reset flip-flop, gets its input signal from pin 6. The voltage at pin 6 is pulled to ground through the 4.7k ohm resistor 20. The signal voltage at pin 6 is raised by the incoming start signal located on the receiver board 61. This turns the I.C. section 112 to the "on" condition from its normally "off" condition. The "on" condition is also known as the "logic 1" level. The I.C. section 112 turns on. The output signal voltage at pin 3 of I.C. section 112 is reduced in magnitude. This low voltage is presented on the base of the Darlington transistor 24 which is a PNP Darlington configuration. The voltage level causes the base of Darlington transistor 24 to switch to low activating the junction box 25 and presenting plus 12 volts to the auxiliary circuits 26 and to the computer by the lead 28. The powering of leads 26 and 28 enables the driving of the start solenoid 30.

The output signal voltage at pin 3 of integrated circuit 112 is also used to bring a low or ground signal level to the integrated circuit sections 114 and 116. Therefore, if this first part of the circuit is not operational, the following portions cannot be operated. Even with power presented to the integrated circuit section 112, the output voltage at pin 3 is held at a "logic 1" or high level until the voltage at pin 6 of integrated circuit section 112 is set to a high level. The flip-flop I.C. section 112 is reset when the voltage at pin 2 reaches a low level. To prevent premature resetting of the integrated circuit section 112, pin 2 is taken to the vcc voltage level through a 10k ohm resistor 76.

A reset signal is also generated by means of a door light switch (not shown) on the vehicle, thus any attempt to open the vehicle door will automatically shut off the vehicle's engine and prevent the theft of the vehicle. The 12 volt door light switch signal must be inverted. This is accomplished by the integrated circuit section 117 which can be a "4066" brand integrated circuit. A Fairchild National Semiconductor Co. product integrated circuit section 114 comprises another "555" brand integrated circuit section assembled as a timer circuit. Circuit section 114 cannot function until pin 3 of integrated circuit section 112 is set to a low voltage. When integrated circuit section 112 is set to a low voltage, pins 120 and 122 of integrated circuit section 114 begin a timing sequence. The capacitor 32 configured with pin 122 of integrated circuit section 114 reaches full charge and turns on or sets I.C. section 114 in the "logic 1" signal level causing the output to be set to a low voltage. The output signal passes through switch 286, pin 130 of the integrated circuit section 117. The signal brings the base of transistor 58 to logic low. Transistor 58 drives several components. The first component being the starter solenoid 30. The second component is the transmitter 34.

A most vital part of this system is the vacuum switch 36 which is connected in series prior to the starting solenoid 30. Once the vehicle has started and the engine (not shown) has built up vacuum, the vacuum switch 36 which is normally closed, opens and does not allow further power to be supplied to the starting solenoid 30. Thus, the vehicle starter (not shown) does not continue to run. This protects the vehicle starter from burn out. Once the vacuum switch 36 opens, it automatically provides power to the transmitter 34 to indicate by a radio transmission to the hand held unit 110 that the vehicle has started. The indication to the user is a "beeper" (not shown) in the hand held unit 110.

The I.C. timer 114 itself is also disabled as soon as the third integrated circuit section 116 time period has expired and its output a low voltage signal. This is done by connecting the control pin of the integrated circuit section 117 to the output pin 128 of the integrated circuit section 116. This no longer allows the logic low to pass through to the integrated circuit section 117 and to the second transistor 58.

The third integrated circuit section 116 is also a number NE "555" brand I.C. section set up as a timer. This timer section 116 also has its pins 124 and 126 tied to the output pin 3 of the first integrated circuit section 112. Integrated circuit section 116 operates as does section 114, only with a longer delay.

Once the capacitor 78 connected between pin 124 and 126 of integrated circuit section 116 has charged, the output voltage on pin 128 of integrated circuit section 116 has a low value; the heater motor 38 of the vehicle is activated to warm the interior of the vehicle and the second integrated circuit section 114 is deenergized. Also, the reset circuit switches 288, 290, 292 and pin 2 of I.C. section 112 are changed in state.

The low voltage of pin 128 plays an important part in the reset circuit sections 280, 282, 284 of I.C. section 117 and pin 2 of I.C. section 112. Not only is the output signal of pin 128 of the integrated circuit section 116 connected to the control pin of switch 286, but pin 128 of the integrated circuit section 116 is also connected to the control pin 132 of switch 288.

Until the integrated circuit section 116 time period has started the reset circuit is inoperable. Since the signal polarity from the vehicle door light switch (not shown) has to be inverted. If the output of pin 128 of the integrated circuit section 116 is at a high voltage, pins 3 and 4 of integrated circuit section 112 are tied together; pin 3 being tied to ground and pin 4 being tied to a control pin on the integrated circuit section 117. A high input voltage signal of the integrated circuit section 117 will bring ground potential to the control pin 134 of switch 292 causing switch 292 to be open or in a high impedance state. This keeps any signal from passing through switch 292. Switch 292 is connected between pin 2 of the integrated circuit section 112 and switch 282 of the integrated circuit section 117. Switch 290 has pin 136 connected to ground and pin 138 connected to pin 140 of switch 292. The control pin of switch 290, pin 142, is connected to the reset door light switch 40 through a 10k ohm resistor 42 with a 7 volt Zener diode 44 with another 10k ohm resistor 46 going to ground as added protection. Once the output signal of the third integrated circuit section 116 is at a low voltage, pin 131 on switch 286 and pin 132 on switch 288 both open, stopping all flow of current. Once the signal at pin 132 of switch 288 is at a low voltage, the control pin of switch 292 closes. The 4.7k ohm resistor 80 connected to vcc and control pin 134 of switch 292 is closed allowing a signal to pass, but until the vehicle door is open, there is no signal. If the vehicle doors are opened, then pin 142 of switch 290 is closed and the ground potential of switch 282 of I.C. section 117 is presented to pin 2 of integrated circuit section 112; the set-reset, flip-flop. The circuit is now reset. The integrated circuit 117 isolates the reset signal from the vehicle until the engine has started and is running because of seat belt chime feedback. The vehicle is prevented from starting in gear by a conventional neutral safety switch (not shown).

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents may be resorted to falling within the scope of the invention as claimed. Although described hereinabove with respect to a remote system for use in controlling the operation of an engine in a vehicle, those skilled in the art will note that the present invention can be used in remotely controlling a variety of systems on a vehicle such as an alarm system. Vehicles as used herein are defined to include, but are not limited to automobiles, trucks, boats, airplanes and other means of conveyance.

I claim as my invention:

1. A system for use in selectively operating components of a vehicle, said system comprising:

an apparatus remote from the vehicle, said apparatus including an input means for providing signals indicative of a desired operational state of the vehicle components;

a digital controller for generating command signals from said input signals and for generating, from decoded component status signals, signals indicative of the operational state of the vehicle components;

a transmitter means receiving said command signals for encoding and providing radio frequency transmission thereof;

a receiver means for receiving and decoding said encoded status signals;

a means for displaying said engine and accessory operational state signals; and an apparatus affixed to the vehicle, said apparatus including a receiver means for receiving and decoding said digitally encoded command signals;

a means configured with the vehicle components for providing signals indicative of the operational state thereof;

a digital controller for generating component status signals from said operational state signals, said controller further for providing component control signals in dependence on said received command signals;

a transmitter means receiving said component status signals, for encoding and providing radio frequency transmission thereof; and a means for operating the vehicle's components in dependence on said control signals;

said vehicle digital controller, during a first time period, further not responding to command signals subsequent to a first received command signal until the expiration of said first time period unless said operational state signal generation means provides signals corresponding to said desired vehicle operational state.

2. The system of claim 1 wherein said remote apparatus controller further comprises means for receiving signals from said vehicle apparatus only after transmission of a first command signal.

3. The system of claim 1 wherein said remote apparatus further comprises a two state command signal generating means having a first state for initialization of a command signal and wherein said remote apparatus controller further comprises means for generating command signals subsequent to a first received command signal only if said command signal generating means has been released from said first state.

4. The system of claim 1 wherein said remote apparatus input means further comprises:

a means for generating a single type signal indicative of one of two desired operational states of said vehicle components; and a means included with said remote apparatus digital controller for determining when said remote apparatus digital controller has received electrical power and for differentiating between an initial input means signal subsequent to said remote apparatus digital controller receiving power and an input means signal generated subsequent thereto, and further for providing, in dependence on said input means signal differentiation, command signals to change a present vehicle component operational state.

5. The system of claim 1 wherein each of said transmitter means and said receiver means further comprise a frequency shifted keying means for encoding and decoding said transmitted and received signals.

6. The system of claim 5 wherein each of said transmitter and receiver means comprises a superregenative carrier frequency signal generator.

7. The system of claim 5 wherein said frequency shift keying means provides for signals comprised of an initial portion of a selected duration indicative of a subsequent data portion.

8. The system of claim 1 wherein said remote apparatus further comprises a means for generating remote apparatus identification signals and wherein said controller further includes a means for responding to received decoded status signals only if said decoded status signals originate from an associated vehicle apparatus; and wherein said vehicle apparatus further comprises a means for generating vehicle apparatus identification signals and wherein said controller further includes a means for responding to received decoded command signals only if said decoded command signals originate from said associated remote apparatus.

9. The system of claim 5 wherein each of said transmitter means for signal transmission modulate a radio frequency carrier signal with first and second audio frequency signals corresponding to a logic 1 and logic 0, respectively.

10. The system of claim 9 wherein said modulated signals are of a fixed duration and are separated by a period of carrier signal transmission only.

11. A computerized system for remotely operating an engine and accessories of a motor vehicle which has a computer that controls operation of the vehicle's engine, said system comprising:

a manually operated apparatus remote from the vehicle, said apparatus including an input means for providing signals indicative of a desired operational state of the vehicle's engine and accessories;

a digital controller including a microcomputer and memory means, said controller for generating command signals from said input signals and for generating, from decoded engine and accessories status signals, signals indicative of the operational state of the vehicle's engine and accessories;

a transmitter means receiving said command signals for encoding and providing radio frequency transmission thereof;

a receiver means for receiving and decoding digitally encoded status signals;

a means for displaying said decoded engine and accessory operational state signals; and an apparatus affixed to the vehicle, said apparatus including a receiver means for receiving and decoding said digitally encoded command signals;

a means configured with the vehicle's engine and accessories for providing signals indicative of the operational state thereof;

a digital controller receiving said decoded command signals and including a microcomputer and memory means, said controller for generating engine and accessory status signals from said operational state signals, said controller further for providing engine and accessory control signals in dependence on said received command signals;

a transmitter means receiving said status signals, for encoding and providing radio frequency transmission thereof; and a means for operating the vehicle's engine and accessories in dependence on said control signals;

said vehicle digital controller, during a first time period, further not responding to command signals subsequent to a first received command signal until the expiration of said first time period unless said operational state signal generation means provides signals corresponding to said desired engine operational state.

12. The system of claim 1 wherein said remote apparatus further comprises a means for generating remote apparatus identification signals and wherein said controller further includes a means for responding to received decoded status signals only if said decoded status signals originate from an associated vehicle apparatus; and wherein said vehicle apparatus further comprises a means for generating vehicle apparatus identification signals and wherein said controller further includes a means for responding to received decoded command signals only if said decoded command signals originate from said associated remote apparatus.

13. The system of claim 11 wherein said remote controller further comprises a means for determining whether there has been a prior vehicle engine start.

14. The system of claim 11 wherein said remote controller further comprises a means for generating a start or stop signal in dependence on whether the vehicle engine is operating or not operating, respectively.

15. The system of claim 11 wherein said remote and vehicle apparatus identification signals includes signals generated from a plurality of dip switches.

16. The system of claim 11 wherein said vehicle apparatus identification means comprises a plurality of dip switches and wherein said vehicle apparatus digital controller is configured to clear said memory means and receive signals from said switches only once after the vehicle apparatus has received electrical power.

17. The system of claim 11 wherein said remote apparatus controller further comprises means for receiving signals from said vehicle apparatus only after transmission of a first command signal.

18. The system of claim 11 further comprising a two state command signal generating means having a first state for initialization of a command signal and wherein said remote apparatus controller further comprises means for generating command signals subsequent to a first command signal only if said command signal generating means has been released from said first state.

19. The system of claim 11 wherein said remote apparatus input means further comprises:

a means for generating a single type signal indicative of one of two desired operational states of said vehicle components; and a means included with said remote apparatus digital controller for determining when said remote apparatus digital controller has received electrical power and for differentiating between an initial input means signal subsequent to said remote apparatus digital controller receiving power and an input means signal generated subsequent thereto, and further for providing, in dependence on said input means signal differentiation, command signals to change a present vehicle component operational state.

20. The system of claim 11 wherein each of said transmitter means and said receiver means each further comprises a frequency shifted keying means for encoding and decoding said transmitted and received signals.

21. The system of claim 20 wherein each of said transmitter and receiver means each comprise a superregenative carrier frequency signal generator.

22. The system of claim 20 wherein said frequency shift keying means provides for signals comprised of an initial portion of a selected duration indicative of a subsequent data portion.

23. The system of claim 11 wherein said remote controller further comprises a means for determining the validity of received input signals.

24. The system of claim 23 wherein said means for determining signal validity determines signal validity by testing the first and twenty-first received bits for identity.

25. The system of claim 20 wherein each of said transmitter means for signal transmission modulate a radio frequency carrier signal with first and second audio frequency signals corresponding to a logic 1 or logic 0, respectively.

26. The system of claim 25 wherein said modulated signals are of a fixed duration and are separated by a period of carrier signal transmission only.

27. The system of claim 11 wherein said vehicle apparatus controller is configured to enter into a start or stop mode operational sequence in dependence on said decoded command signals.

28. The system of claim 27 wherein said digital controller means for generating a start signal further provides, in sequence, signals for energizing the vehicle computer and energizing and engine starter.

29. The system of claim 11 wherein said operational state means comprises an engine vacuum switch and a vehicle door position switch, said vehicle controller further comprising means for determining when said engine starter has been energized, for determining the presence of engine vacuum and determining door position, said status signals further comprising engine start verification signals if said engine vacuum is present and stop verification signals if engine vacuum is not present or if a vehicle door is open.

30. The system of claim 29 wherein said vehicle controller provides control signals to said engine starter for a period not to exceed 8 seconds.

31. The system of claim 27 wherein said digital controller provides control signals to a vehicle accessory after generating said start verification signals.

32. The system of claim 29 wherein vehicle controller provides said engine and accessory control signals to operate said engine and accessories for a selected time period after said engine start verification start signal has been generated.

33. The system of claim 29 wherein vehicle controller provides for said engine and accessory control signals to operate said engine and accessories during said time period only when said engine vacuum switch and door position switch indicates the presence of engine vacuum and door closure, respectively.

34. The system of claim 29 wherein said vehicle controller further generates control signals to terminate the operation of the engine and accessories if the vehicle controller receives signals indicating an absence of engine vacuum or an open vehicle door or the operation of said starter in excess of 8 seconds or the operation of the engine for a time greater than a selected period.

35. The system of claim 34 wherein said vehicle controller, if said engine and accessory termination control signals have been generated, further generating signals for resetting relays associated with said accessories, deenergizing the car computer and providing status signals including vehicle stop verification, indicative of said engine and accessory operation.

36. The system of claim 11 wherein said remote and vehicle apparatus receivers are configured to receive signals for only a fraction of a time period.

37. The system of claim 36 wherein said remote and vehicle receivers are configured to receive signals for 10 milliseconds out of every 100 millisecond period.

* * * * *